Jan. 13, 1925.

F. H. BEYEA 1,522,797

METALLIC TIRE BEAD AND PROCESS OF MAKING SAME

Filed May 26, 1921

Inventor
Frank H. Beyea
By G. L. Ely
Atty.

Patented Jan. 13, 1925.

1,522,797

UNITED STATES PATENT OFFICE.

FRANK H. BEYEA, OF AKRON, OHIO, ASSIGNOR TO JOHN R. GAMMETER, OF AKRON, OHIO.

METALLIC TIRE BEAD AND PROCESS OF MAKING SAME.

Application filed May 26, 1921. Serial No. 472,623.

*To all whom it may concern:*

Be it known that I, FRANK H. BEYEA, a citizen of the United States, residing at Akron, county of Summit, State of Ohio, have invented certain new and useful Improvements in Metallic Tire Beads and Processes of Making Same, of which the following is a specification.

This invention relates particularly to the art of manufacturing pneumatic tires, although the principles involved in the disclosed method of manufacture and the article derived therefrom may be useful in other arts.

The purpose of the invention is to construct a metallic bead ring or bead core which is used in the manufacture of pneumatic tires having inextensible beads, improving upon the methods of manufacture which have been in use heretofore.

In the manufacture of inextensible bead tires it is customary to incorporate within the bead of the tire a non-stretchable element, usually a metallic hoop or ring which forms the inextensible core for the bead. Different forms of beads have been manufactured and various methods of manufacture have been used, as is well known in the art. This invention relates particularly to the manufacture of a bead core of the cable type. A method in use heretofore has consisted in making a cable bead by welding or otherwise joining together straight lengths of cable to form a hoop or ring. The subsequent expansion to which the ring is subjected often causes it to fail at the joint, and a bead manufactured in this way has not been satisfactory for this reason. For the purpose of remedying this fault a bead has been developed which is made in a cable hoop by winding a single strand of wire upon itself in ring form until the required number of wires have been incorporated in the cable, the end of the wire after being cut, being tucked into place in the bead. This form of cable has not been satisfactory for when it is expanded before being placed in the bead, there is, due to the fact that the expansion is in the main afforded by a tightening of the coils, a tendency for the bead to reassume its former circumference.

The object of the present invention is to construct a bead core, or hoop of wire twisted or wound into cable form, which will present none of the disadvantages found in the prior form of cable, and which will be inexpensive and easy of manufacture.

The form of wire hoop or ring of my present invention is illustrated in the accompanying drawings which show the various steps in the manufacture of the bead.

Figure 1:
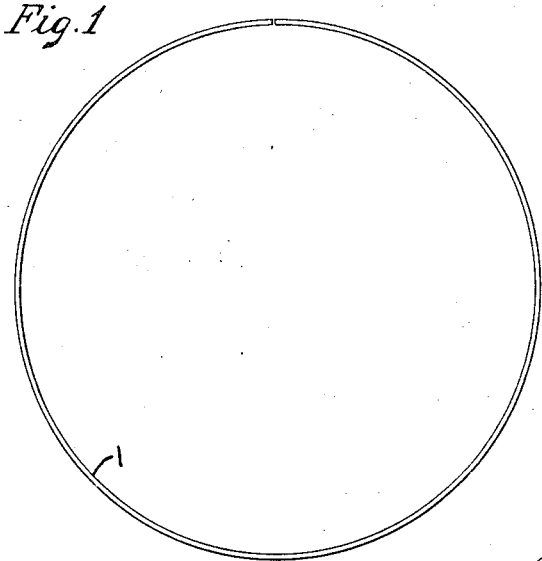
Fig. 1 illustrates the wire core which forms the foundation of the bead.
Figure 2:
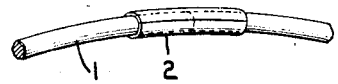
Fig. 2 illustrates one method of connecting the ends of the wire core.

The cable hoop to form the bead is constructed on a single circular wire core or bead center indicated by the numeral 1. This, as shown in Fig. 1, is a plain wire ring the ends of which abut and may be held together by a sleeve or collar 2, as shown in Fig. 2, it being preferred to leave the ends of the wire 1 disconnected, the sleeve allowing a certain amount of separation without destruction of the ring. To form the main body or outer portion of the bead there is provided a single length of wire 3 which is wrapped about the core 1 in the manner shown in Fig. 3. As the wire 3 is heavy it is preferably formed into evenly undulating curves or sinuosities as shown in the drawings, before being wrapped about the center wire 1, the form of undulations being determined as found desirable in practice. The shaping of the wire may be obtained by crimping the wire in any manner found suitable.

Figure 3:
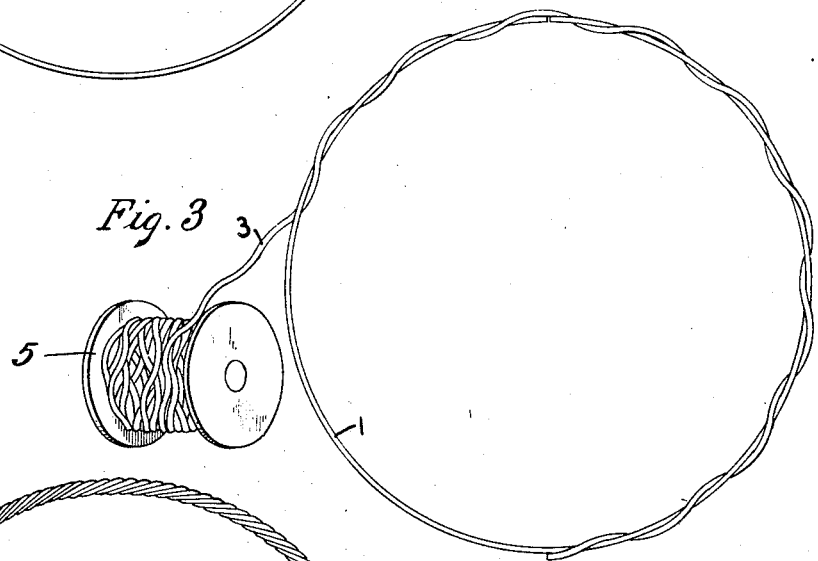
Fig. 3 shows the method of wrapping or twisting the outer wire.

It will be noted from an inspection of Fig. 3, that the wire is shown assembled upon a spool or carrier 5, in crimped or spiraled condition. In order to feed the wire to the core wire and wrap it therearound without altering its preformed spiral condition, it is necessary that it pass from the spool without twisting. For this reason the spool should be passed around the core wire 1 in a peculiar manner. This method of covering the bead forms the subject matter of my copending application Serial No. 499,305 filed September 8, 1921.

The single strand of covering wire is started about the core and the wire 3 passed around the wire 1, the pitch of spiral wrapping being governed in a measure by the sinuosity of the wire so that the covering wire will coil about the center wire without distorting it. After the wire 3 has been wrapped around the center wire 1 a sufficient number of times it is cut adjacent the leading end of the wire and the two ends are joined together by brazing or soldering to make a fast joint at 4.

Figure 4:
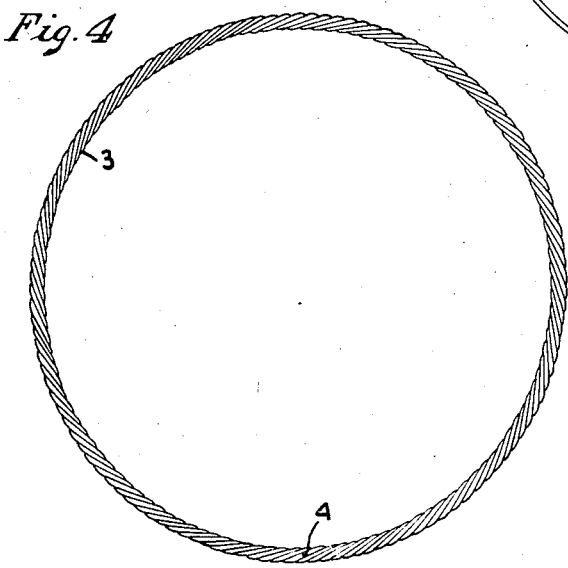
Fig. 4 shows a completed hoop or ring.

The bead core in the form of the endless cable of Fig. 4, is preferably made somewhat smaller than its finished circumference, and is placed in any suitable stretching apparatus by which it is expanded to the correct size for use. As the ends of the wire 4 are permanently joined together, the expansion is necessarily obtained by stretching of the wire which is given a permanent set so that there is no tendency of the cable to resume its former circumference.

While the description of the hoop or ring of cable has been somewhat detailed, it is obvious that variations in the construction of the bead or in the method of manufacture may be made without departing from the essential features of the invention or sacrificing any of its benefits.

I claim:

1. A wire ring for use in tire beads or for similar purposes, comprising a core wire the ends whereof abut but are unconnected, and a wrapping of a second wire wound therearound a plurality of times, the ends of the second wire being permanently joined together.

2. A wire ring for use in tire beads or for similar purposes, comprising a core wire the ends whereof abut but are unconnected, a sleeve surrounding the ends of the core wire, and a wrapping about said core wire formed of a single wire strand wrapped about the core wire.

3. A wire ring for use in tire beads or for similar purposes, comprising a core wire the ends whereof abut but are unconnected, a sleeve surrounding the ends of the core wire, and a wrapping about said core wire formed of a single wire strand wrapped about the core wire, the ends whereof are permanently joined together to form an endless wire.

4. The method of forming a wire ring for use in tire beads or for similar purposes, comprising forming a wire core ring with its ends abutting but unconnected, shaping a second wire in a plurality of spiral convolutions and wrapping the second wire about the core ring until it is covered, and then permanently connecting the ends of the second wire.

5. The method of forming a wire ring for use in tire beads or for similar purposes, comprising forming a wire core ring, holding the ends of the core ring in alinement but permitting their separation, shaping a second wire in a plurality of spiral convolutions, and wrapping the second wire about the core ring until it is covered.

6. The method of forming a wire ring for use in tire beads or for similar purposes, comprising forming a wire core ring, holding the ends of the core ring in abutment but permitting their separation, shaping a second wire in a plurality of spiral convolutions and wrapping the second wire over the core ring until it is covered, joining the ends of the second wire together, and stretching the wire ring so formed to cause its covering spirals to be compacted, the open ends of the core ring permitting the ends thereof to separate during the stretching operation.

7. The method of forming a wire ring for use in tire beads or for similar purposes, comprising forming a wire core ring with its ends in abutment but unconnected, shaping a second wire in a plurality of convolutions until it is covered, and stretching the wire ring so formed to cause its covering spirals to be compacted, the open ends of the core ring permitting the ends thereof to separate during the stretching operation.

8. The method of forming a wire ring for use in tire beads or for similar purposes, comprising forming a wire core ring with its ends in abutment but unconnected, shaping a second wire in a plurality of convolutions until it is covered, connecting the ends of the covering wire together, and stretching the wire ring so formed to cause its covering spirals to be compacted, the open ends of the core ring permitting separation thereof during the stretching operation.

FRANK H. BEYEA.